F. C. BRANDENBURG.
CUTTER FOR EMERY WHEEL DRESSING TOOLS.
APPLICATION FILED APR. 10, 1919.

1,401,666.

Patented Dec. 27, 1921.

Inventor:
F. C. Brandenburg
By Lacey & Lacey.
Attys.

UNITED STATES PATENT OFFICE.

FRANCIS C. BRANDENBURG, OF PIQUA, OHIO.

CUTTER FOR EMERY-WHEEL-DRESSING TOOLS.

1,401,666. Specification of Letters Patent. Patented Dec. 27, 1921.

Application filed April 10, 1919. Serial No. 288,935.

*To all whom it may concern:*

Be it known that I, FRANCIS C. BRANDENBURG, a citizen of the United States, residing at Piqua, in the county of Miami and State of Ohio, have invented certain new and useful Improvements in Cutters for Emery-Wheel-Dressing Tools, of which the following is a specification.

This invention relates to cutters for emery wheel dressing tools and has as its object to provide an improved form of cutter designed for smooth dressing such wheels, the cutter being especially designed for use in connection with the tool forming the subject matter of my Patent No. 1,042,761, issued October 29, 1912, and the improvement thereon shown in my copending application filed simultaneously herewith, Serial No. 288,934.

Another object of the invention is to provide a tool which will impart a spirally roughened face to the emery or other grinding wheel being smooth dressed and which will evenly and yet rapidly act upon the face of the wheel to dress the same.

Another object of the invention is to provide a cutter the individual units of which may be pressed or stamped from sheet metal and thus manufactured at a low cost.

A further object of the invention is to provide a cutter the units of which will have such form that when a number of them are assembled they will be held against rotation past one another in one direction and yet may have freedom for limited turning movement in the opposite direction and likewise freedom for a limited movement along the shaft.

Figure 1:
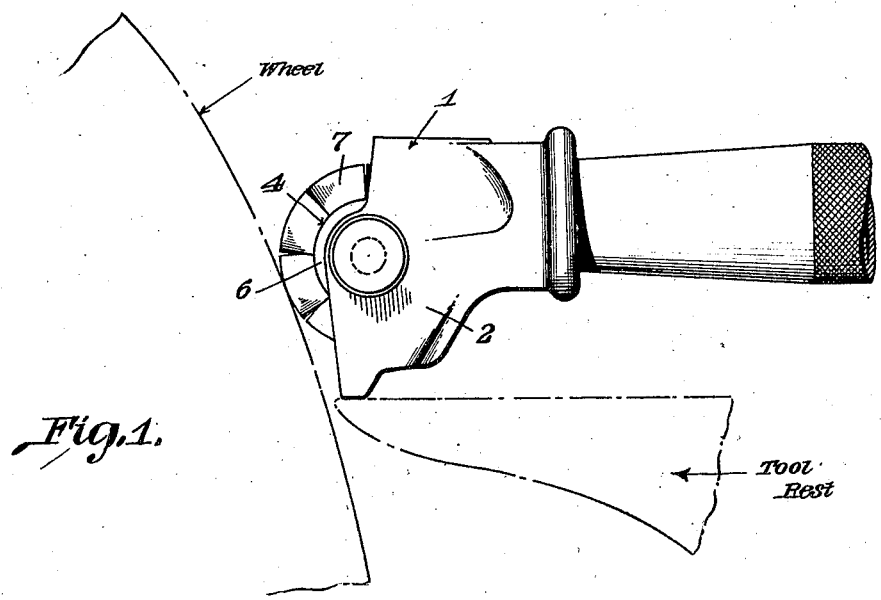
Figure 1 is a side elevation of the cutter embodying the present invention mounted in the head of the tool in connection with which it is to be employed and illustrating the manner of using the tool.

As the tool itself is described and claimed in my said patent and copending application, a specific description thereof is not here necessary, it being sufficient to state that the head of the tool, indicated in general by the numeral 1 in the drawings, is provided with spaced cheek pieces 2 between which the cutter is mounted and in which cheek pieces there is rotatably mounted a bearing spindle for the cutter indicated by the numeral 3. The cutter comprises an assemblage of units and as these units are of counterpart construction, a description of one will suffice for all. Each of these units, indicated in general by the numeral 4, is stamped or pressed from a circular sheet metal blank and in the stamping or pressing operation the blank is first formed with a number of incisions to define the teeth of the unit, said incisions extending radial to the axis of the unit and the material between adjacent incisions being acted upon to form the teeth. The unit is formed centrally with an opening 5 to receive the spindle 3, and each unit comprises a web portion 6 lying within the circle touched by the inner ends of all of the incisions, this web portion being flat upon both of its faces and, of course, when the unit is fitted upon its spindle, occupying a plane at right angles to the axis of the spindle.

The teeth of the cutter unit are indicated each by the numeral 7 and each of these teeth is pressed to helical form, all of the teeth being correspondingly arranged or, in other words, distorted or twisted in the same direction. This distortion or twist in each tooth is uniform so that the side edges of each tooth, which previously constituted the walls of two of the incisions lie at opposite sides of the plane occupied by the web portion 6 of the unit. Also it will be evident that the outer edges of the teeth are all inclined in the same general direction and extend along lines spiral to the axis of the unit. It will further be evident and particularly by reference to Fig. 3 of the drawings, that the adjacent edges of adjacent teeth are located opposite each other at opposite sides of the plane of the web portion of the unit.

In building up the cutter, the desired number of units are assembled by disposal side by side upon the spindle 3 and when so disposed the side faces of the teeth of one unit will contact the side faces of the teeth of the next adjacent unit throughout the series. Also it is evident that when the units are properly assembled they will in a sense interlock so that relative rotation or turning of the teeth in one direction is positively prevented although there may be a slight relative movement of the teeth in the opposite direction of rotation which latter is desirable provided such movement or play is very limited. It will be understood, moreover, that the interlocking or interfitting of the units does not interfere with lateral displacement of the units with relation to one another, but this movement also is limited by the provision upon the spindles at the opposite ends of the assemblage of units, of washers 8 which contact the outer faces of the web portions 6 of the end units of the assemblage and also the inner or opposing faces of the cheek pieces 2 of the head of the tool 1 and which are of sufficient thickness to space the teeth from the said cheek pieces so that in the rotation of the cutter these teeth will not come into contact with the inner faces of the said cheek pieces to interfere with the rotation of the cutter upon its spindle.

Figures 2, 3, 4:
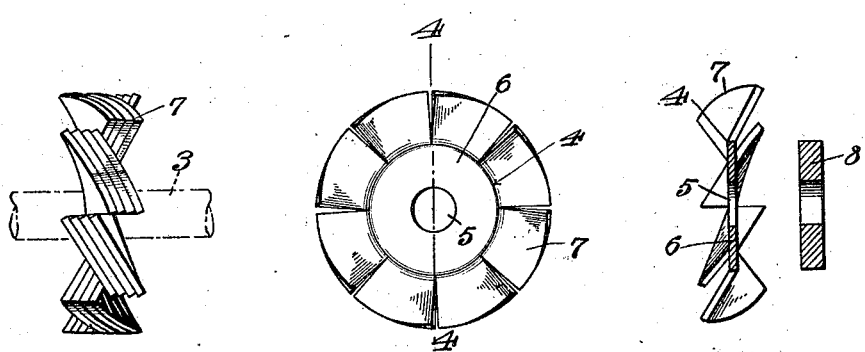
Fig. 2 is an edge view of the cutter comprising the assembled units.
Fig. 3 is a side elevation of one of the units.
Fig. 4 is a vertical sectional view on the line 4—4 of Fig. 3, the view also illustrating one of a pair of spacing or thrust washers employed in connection with the cutter.

It will be evident from the foregoing and from inspection of the drawing and particularly Fig. 2, that in the rotation of the cutter the face of the emery or other grinding wheel being dressed will have substantially spirally extending striations cut therein and due to the fact that the outer edges of all of the teeth of the units are inclined in the same direction and no material is removed from between adjacent teeth of any unit in the formation of the teeth, the dress given to the face of the grinding wheel will be a smooth one.

Having thus described the invention, what is claimed as new is:

1. A cutter for a dressing tool comprising an assemblage of cutter units, each having a peripheral series of teeth having their cutting edges extending diagonally across the plane of the unit, corresponding teeth of adjacent units abutting throughout the area of their side faces throughout the series.

2. A cutter for a dressing tool comprising an assemblage of cutter units disposed with their side faces in mutual contact throughout the series, the said units being provided with registering incisions and the material between the incisions being distorted to provide teeth, corresponding teeth of the units abutting side by side throughout the series.

3. A cutter for a dressing tool comprising an assemblage of cutter units each having a peripheral series of helically disposed teeth, the units being arranged side by side and abutting throughout their area with the teeth of adjacent units interlocking in a manner to permit relative rotation of the teeth in one direction and prevent rotation of the teeth in the other direction except to resume their normal relation.

4. In a dressing tool, a plurality of rotatably mounted disks having peripheral teeth with their cutting edges disposed obliquely to the plane of the disk, said disks being arranged side by side and abutting throughout their area to be locked by the teeth against rotation past one another in one direction and free to turn to a limited extent in the opposite direction.

5. In a dressing tool, a plurality of toothed disks with their side faces in contact, the teeth of each disk being spirally formed and said disks being confined by the teeth against relative rotative displacement beyond a predetermined degree whereby corresponding abutting teeth of adjacent disks may dispose their registering side edges in planes oblique to the axis of the disks.

In testimony whereof I affix my signature.

FRANCIS C. BRANDENBURG.